United States Patent
Kano et al.

(10) Patent No.: US 8,555,197 B2
(45) Date of Patent: Oct. 8, 2013

(54) SYSTEM AND PROCESS FOR PRIORITIZING OVERLAPPING WINDOWS

(75) Inventors: Izua Kano, Tokyo (JP); Kazuhiro Yamada, Tokyo (JP); Dai Kamiya, Tokyo (JP); Yasushi Onda, Tokyo (JP); Keiichi Murakami, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 199 days.

(21) Appl. No.: 12/811,139

(22) PCT Filed: Dec. 16, 2008

(86) PCT No.: PCT/JP2008/072849
§ 371 (c)(1),
(2), (4) Date: Jun. 29, 2010

(87) PCT Pub. No.: WO2009/087866
PCT Pub. Date: Jul. 16, 2009

(65) Prior Publication Data
US 2010/0287495 A1    Nov. 11, 2010

(30) Foreign Application Priority Data
Jan. 7, 2008  (JP) ................................. 2008-000642

(51) Int. Cl.
*G06F 3/0481* (2013.01)

(52) U.S. Cl.
USPC ............................ 715/794; 715/790; 715/793

(58) Field of Classification Search
USPC ......................................... 715/794, 790, 793
See application file for complete search history.

(56) References Cited

U.S. PATENT DOCUMENTS

| 4,890,257 A | 12/1989 | Anthias et al. |
| 6,043,817 A | 3/2000 | Bolnick et al. |
| 7,257,777 B1 * | 8/2007 | Kanevsky et al. ............ 715/794 |
| 2003/0046674 A1 * | 3/2003 | Gentry et al. ................ 717/171 |

FOREIGN PATENT DOCUMENTS

| JP | 08-161139 | 6/1996 |
| JP | 10-198627 | 7/1998 |
| JP | 2001175239 | 6/2001 |
| JP | 2005-301890 | 10/2005 |
| JP | 2009193089 | 8/2009 |
| WO | 0233541 A2 | 4/2002 |
| WO | 2007138976 A1 | 12/2007 |

OTHER PUBLICATIONS

Applicant: NTT DOCOMO, Inc., European Examination Report dated Jul. 12, 2011, European Application No. 08 870 000.00-2205, pp. 1-7.

(Continued)

*Primary Examiner* — Doug Hutton, Jr.
*Assistant Examiner* — Ashley Fortino
(74) *Attorney, Agent, or Firm* — MKG, LLC

(57) ABSTRACT

An information-processing device stores information as assignment information to assign associated hardware or software to each window that displays processing details of an application. An association between a window and hardware or software is different for each application (in other words, for each window). If plural overlapping windows are displayed, the information-processing device determines a window to be displayed in the foreground, on a basis of the association. For example, in a case where window w1 of a game and window w2 of another game overlap each other, if the information-processing device has hardware or software associated with game A, window w1 is displayed at the front; and meanwhile if the device has hardware or software associated with game B, window w2 is displayed at the front.

5 Claims, 6 Drawing Sheets

(56) References Cited

OTHER PUBLICATIONS

Applicant: NTT DOCOMO, Inc., Chinese First Notification of Office Action dated Nov. 24, 2011, Chinese Patent Application No. 200880124272.5, pp. 1-9.

Applicant: NTT DOCOMO, Inc., Supplemental European Search Report dated Jul. 4, 2011, European Application No. 08 870 000.00-2205, pp. 1-5.

* cited by examiner

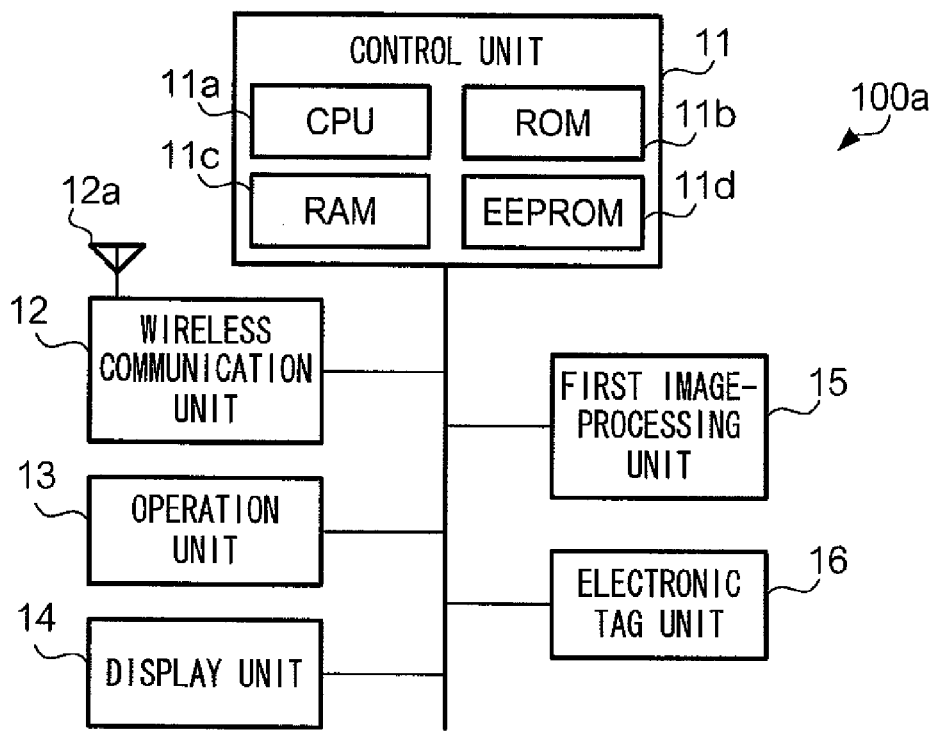
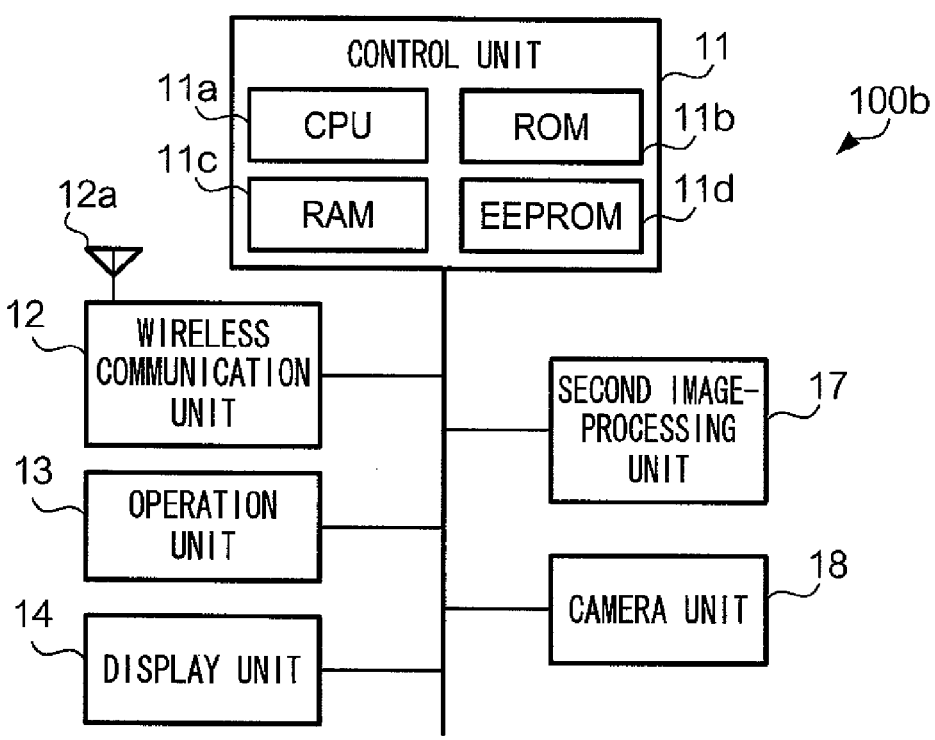

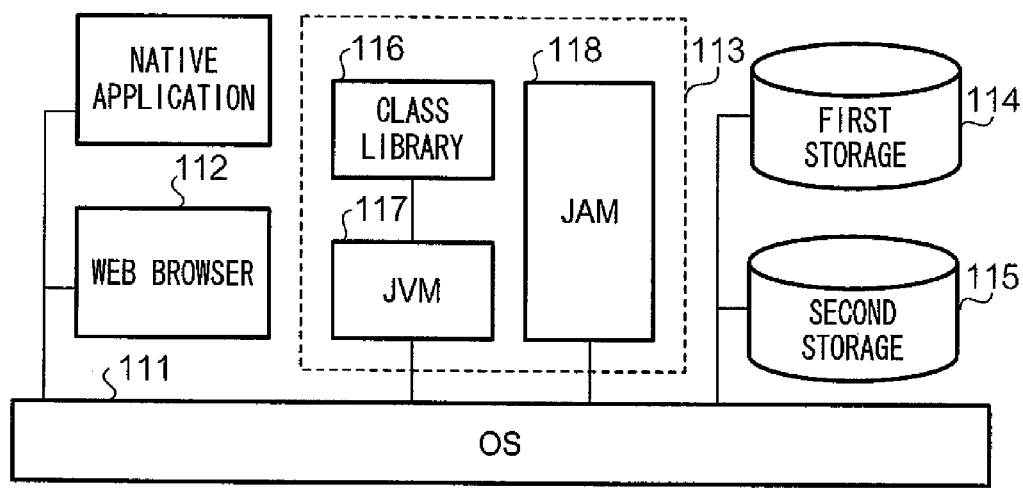

| APPLICATION NAME | ID | ORDER LEVEL |
|---|---|---|
| GAME A | 101 | 2 |
| GAME B | 104 | 3 |
| BALANCE INQUIRY APPLICATION | 203 | 1 |
| ⋮ | ⋮ | ⋮ |

(a)

| APPLICATION NAME | ID | ORDER LEVEL |
|---|---|---|
| GAME A | 101 | 2 |
| GAME B | 104 | 1 |
| ⋮ | ⋮ | ⋮ |

(b)

(a)   (b)

| WINDOW | ASSOCIATION | ORDER LEVEL | PRIORITY LEVEL |
|---|---|---|---|
| wa | YES | 4 | 2 |
| wb | YES | 6(LOWEST) | 3 |
| wc | YES | 3 | 1(HIGHEST) |
| wd | NO | 1(HIGHEST) | 4 |
| we | NO | 5 | 6(LOWEST) |
| wf | NO | 2 | 5 |

SYSTEM AND PROCESS FOR PRIORITIZING OVERLAPPING WINDOWS

TECHNICAL FIELD

The present invention relates to a GUI (Graphical User Interface).

BACKGROUND ART

A technique of display control in a case where plural windows overlap each other is known, as described in JP-A-8-161139. JP-A-8-161139 discloses, for example, in a case where at least two windows are displayed on a display screen so that the two windows partly overlap each other, replacing a window in the foreground with a window in the background at predetermined intervals of time, and determining for each window a length of time to display the window in the foreground, depending on the length of time for which the window is used.

SUMMARY

A hardware configuration and software configuration may differ between information-processing devices. For example, hardware configurations between mobile phones differ for each model, and it may be possible for a user to add to or delete from a mobile phone a variety of different software.

In view of the foregoing, it is an object of the present to change a display of plural windows on a basis of a configuration of a device An information-processing device according to the present invention includes: assigning means for assigning hardware or software to windows displayed on a display means; identifying means for identifying overlapping windows on the display means; judging means for judging for the overlapping windows identified by the identifying means whether hardware or software assigned by the assigning means to the overlapping windows is included in the device; determining means for determining display priority levels among the overlapping windows identified by the identifying means, so that an overlapping window judged by the judging means to have assigned to the window hardware or software included in the device is accorded a higher priority level; and display controlling means for controlling among the overlapping windows display of the window determined by the determining means to have the higher priority level in front of other of the windows that are not determined to have the higher priority level.

The information-processing device according to the present invention may include window selecting means for selecting a window; and if the window selected by the window selecting means is included in the overlapping windows identified by the identifying means, the display controlling means may display the window in a foreground.

Alternatively, the information-processing device according to the present invention may include window selecting means for selecting a window; and if the window selected by the window selecting means is included in the overlapping windows identified by the identifying means, the determining means may determinate display priority levels for overlapping windows other than the window.

In the information-processing device according to the present invention, if the judging means judges for a plurality of overlapping windows identified by the identifying means that hardware or software assigned by the assigning means to the overlapping windows is included in the device, the determining means may set a priority level of a window for which a processing of hardware or software assigned to the window is being executed, to be higher than a priority level for other of the windows.

In the information-processing device according to the present invention, if the judging means judges for a plurality of overlapping windows identified by the identifying means that hardware or software assigned by the assigning means to the overlapping windows are included in the device, the determining means may set a priority level of a window for which a processing of hardware or software assigned to the window has been executed most recently, to be higher than a priority level for other of the windows.

A program according to the present invention causes a computer to execute the steps of: assigning hardware or software to windows displayed on a display means; identifying overlapping windows on the display means; judging for the identified overlapping windows whether hardware or software assigned to the overlapping windows is included in a device; determining display priority levels among the overlapping windows, so that an overlapping window judged to have assigned to the window hardware or software included in the device is accorded a higher priority level; and controlling among the overlapping windows display of the window determined to have the higher priority level in front of other of the windows that are not determined to have the higher priority level According to the present invention, if a device includes assigned hardware or software, display priority levels are determined such that a window, to which the software and hardware are assigned, is displayed at the front. Accordingly, display of plural windows can be changed on a basis of a configuration (a hardware configuration or a software configuration) of the device.

BRIEF DESCRIPTION OF THE DRAWINGS

FIG. 1 is a block diagram showing a hardware configuration of an information-processing device according to the present invention.

FIG. 2 is a block diagram showing a hardware configuration of an information-processing device according to the present invention.

FIG. 3 is a diagram showing a logical configuration of an information-processing device.

FIG. 4 is a diagram showing configuration information.

DETAILED DESCRIPTION

Figures 5, 11:
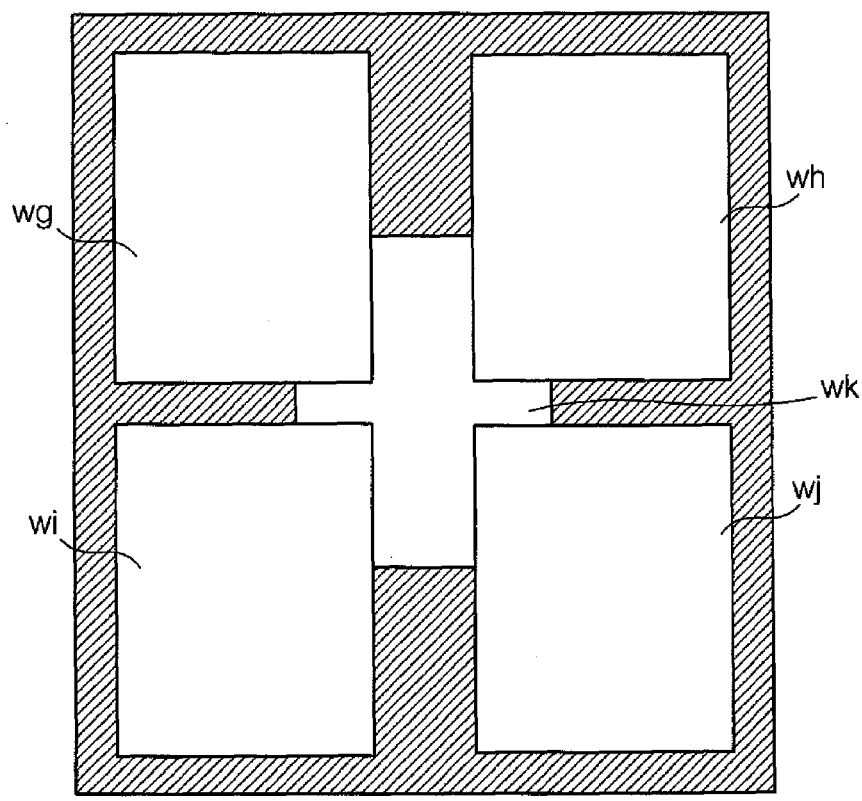
FIG. 5 is a diagram showing assignment information.
FIG. 11 is a diagram illustrating display of windows.

Embodiments of the present invention will be described below with reference to the drawings.

FIG. 1 and FIG. 2 are each block diagrams showing hardware configurations of information-processing devices according to an embodiment of the present invention. FIG. 1 shows a hardware configuration of image-processing device 100*a*, and FIG. 2 shows a hardware configuration of image-processing device 100*b*. Information-processing devices 100*a* and 100*b* are each mobile phones, and while they have some basic configurations in common, they also have configurations that are particular to each device¥

Hereinafter, information-processing devices 100a and 100b are collectively referred to as "information-processing device 100," except where it is necessary to specify one or other device in particular.

Information-processing device 100a has control unit 11, wireless communication unit 12, operation unit 13, display unit 14, first image-processing unit 15, and electronic tag unit 16. Control unit 11 has CPU (Central Processing Unit) 11a, ROM (Read Only Memory) 11b, RAM (Random Access Memory) 11c, and EEPROM (Electronically Erasable and Programmable ROM) 11d. CPU 11a executes a program stored in ROM 11b or EEPROM 11d while using RAM 11c as a work area, to control components of information-processing device 100a. Wireless communication unit 12 has antenna 12a, and wirelessly communicates data with a predetermined mobile communication network. Operation unit 13 has plural operation keys such as buttons, and provides an operation signal corresponding to a user operation to control unit 11. Display unit 14 has a liquid crystal display and a liquid crystal driver circuit, and displays an image on the basis of display data provided from control unit 11. First image-processing unit 15 has a Large Scale Integration (LSI) dedicated to image processing, and executes processing related to drawing an image on display unit 14. Electronic tag unit 16 has an electronic tag such as a Radio Frequency Identification (RFID) tag, and realizes a so-called electronic settlement function of making settlement using data pre-stored data.

Information-processing device 100b has control unit 11, wireless communication unit 12, operation unit 13, display unit 14, second image-processing unit 17, and camera unit 18. Control unit 11, wireless communication unit 12, operation unit 13 and display unit 14 have the same configuration as information-processing device 100a. Second image-processing unit 17 has a LSI dedicated to an image processing in common with first image-processing unit 15; however second image-processing unit 17 differs from first image-processing unit 15 in image-processing capability. In this embodiment, the image-processing capability of second image-processing unit 17 is lower than that of first image-processing unit 15. Camera unit 18 has an imaging sensor for taking a picture, and generates picture data representing a picture (for example, a face of a user).

As described above, information-processing device 100a differs from information-processing device 100b in that it has a configuration that includes first image-processing unit 15 and electronic tag unit 16. On the other hand, information-processing device 100b differs from information-processing device 100a in that it has a configuration that includes second image-processing unit 17 and camera unit 18. In other words, first image-processing unit 15, electronic tag unit 16, second image-processing unit 17 and camera unit 18 are configurations that are particular to either information-processing device 100a or information-processing device 100b.

Next, a software configuration of information-processing device 100a and information-processing device 100b will be described.

ROM 11b stores some programs in advance. These programs are referred to hereinafter as "preinstalled programs." Specifically, the preinstalled programs include a multitasking operating system (hereinafter referred to as "multitasking OS"), a Java (Registered Trademark) platform, and native applications. The multitasking OS is an operating system supporting various functions such as allocation of virtual memory spaces, which are necessary to realize a pseudo-parallel execution of plural tasks using a TSS (Time-Sharing System). The Java platform is a bundle of programs that are described in accordance with a CDC (Connected Device Configuration) which is a configuration for providing Java execution environment 113 (described later) in information-processing device 100 with a multitasking OS. The native applications are programs for providing basic functions of information-processing device 100 such as voice communication and a web browsing.

EEPROM 11d has a Java application storage area for storing Java applications. A Java application has: a JAR (Java Archive) file combined with a main program in which a processing sequence executed under the Java execution environment is described, with image files and audio files used when the main program is running; and an ADF (Application Descriptor File) in which information on installation and opening of the JAR file and various attribute information are described. A Java application is created by a content provider or a carrier, and stored in an external server device, and in response to a request from information-processing device 100, is sent to information-processing device 100 from the server device.

FIG. 3 is a diagram showing a logical configuration of components provided in control unit 11 of information-processing device 100 through execution of programs stored in ROM 11b and EEPROM 11d. As shown in the drawing, in control unit 11 executing programs, web browser 112 and Java execution environment 113 are provided in OS 111. In EEPROM 11d, first storage 114 and second storage 115 are secured.

Java execution environment 113 is provided through a Java platform stored in ROM 11b. Java execution environment 113 includes class library 116, JVM (Java Virtual Machine) 117, and JAM (Java Application Manager) 118. Class library 116 is a collection file of program modules (classes) that provides a particular function. JVM 117 provides a Java execution environment optimized for the above CDC, and provides a function of interpreting and executing bytecode provided as a Java application. JAM 118 provides a function of managing download, installation, opening and closing of a Java application.

First storage 114 is a storage area for storing Java applications (JAR files and ADFs) downloaded under the control of JAM 118. Second storage 115 is a storage area for storing data that is generated during execution of a Java application after the application closes. A storage area of second storage 115 is assigned to each installed Java application. Data of a storage area assigned to a Java application can be rewritten during execution of the Java application, and cannot be rewritten by another Java application.

Information-processing devices 100a and 100b are each provided with two game applications (in other words, software) in the form of Java applications. These applications are referred to hereinafter as "game A" and "game B," respectively. Game A is an application requiring a relatively high image-processing capability. Game B is an application used for data exchange between users via wireless communication unit 12, which data may include picture data. In other words, game A is an application that is more appropriate for operation in image-processing device 100a; while game B is more appropriate for operation in image-processing device 100b. However, game A and B are applications that each of image-processing device 100a and image-processing device 100b is able to execute.

Information-processing device 100a also has as native applications each of an electronic settlement application and a balance inquiry application. The electronic settlement application realizes the electronic settlement function described above. The electronic settlement application controls communication between electronic tag unit 16 and a reader/writer provided in a shop, and exchanges data representing a monetary value (hereinafter, referred to as "electronic value"). The balance inquiry application displays a balance of an electronic value available in an electronic settlement function.

EEPROM 11*d* stores configuration information and assignment information, other than the data described above. The configuration information represents a hardware configuration and software configuration of information-processing device 100. In other words, the configuration information represents hardware and software included in information-processing device 100. The assignment information is used for assigning hardware or software associated with applications. Each application is executed and displayed in a predetermined window on display unit 14. Thus assignment information can be considered to be information for assigning hardware or software associated with a window that displays processing details of an application.

FIG. 4 is a diagram showing configuration information. FIG. 4(*a*) shows configuration information stored in image-processing device 100*a*, and FIG. 4(*b*) shows configuration information stored in image-processing device 100*b*. As shown in the drawing, the configuration information consists of a data associating "name" and "ID" for each hardware and software included in image-processing device 100. "Name" is information used to identify each hardware or software included in image-processing device 100; and such information may include a model number of the hardware in a case of hardware, or may be information including a file name or version information of software in a case of software. In addition, "Name" may include information representing each of a hardware manufacturer, or information representing a software creator. "ID" is information uniquely assigned to each hardware and software. For example, "ID" may be a character string or a number string that is assigned in accordance with a predetermined rule.

Control unit 11 of information-processing device 100 is able to identify both a hardware configuration and software configuration of the device, by referring to the configuration information. In other words, control unit 11 is able to determine whether predetermined hardware or software is included in the device, by determining whether the hardware or software is described in the configuration information.

FIG. 5 is a diagram showing assignment information. FIG. 5(*a*) shows assignment information stored in information-processing device 100*a*, and FIG. 5(*b*) shows assignment information stored in information-processing device 100*b*. As shown in the drawing, assignment information consists of data associating "application name," "ID" and "order level." "Application name" is information used to identify each application. For example, "Application name" may be a name (a file name) assigned to each application, or be a location where the application is stored (an address or a directory). "ID" is information for identifying each of an item of hardware or software that corresponds to an application, and any "ID" described in configuration information is may be included. However, if an application is not associated with any particular hardware or software of the device, "ID" does not have a significant value, and data having no relation to hardware or software, such as a null value, is described. "Order level" is a value representing an order assigned to a window corresponding to each application. This value may be determined on a basis of a frequency at which a window corresponding to the application is displayed, or a display time length, or other may be determined by a user.

In the present embodiment, "window" refers to a display area assigned to an application when the application provides a particular function. The display areas may have any shape or appearance; thus, the display areas need not have a typical window-like shape (rectangular). For convenience of explanation, however, in the drawings referred to in the following description, windows are depicted as having a rectangular shape. In addition, when another window is displayed in the front of a window, only another window in the front is visible in the overlapping part, and a display area of the window overlapping with another window is not visible. In the following description, a location of a window that is partially hidden by a front window is referred to as "back," in contrast to front.

Assignment information shown in FIG. 5(*a*) indicates that: "game A" is associated with "first image-processing unit (ID=101);" "game B" is associated with "camera unit (ID=102);" and "balance inquiry application" is associated with "electronic settlement application (ID=203)." In addition, this assignment information indicates that: "game A" has an order level of "2;" "game B" has an order level of "3;" and "balance inquiry application" has an order level of "1." In FIG. 5, a smaller value of "order level" correlates with a higher priority level.

It is to be noted that hardware or software associated with an application is not required to be included in the device. For example, hardware or software that may be added in the future can be associated with an application. Further, assignment information may be updated when a new application is installed, and hardware or software associated with the application may be newly described in the assignment information.

The foregoing is a description of the configuration of information-processing device 100. Information-processing device 100 with the above configuration executes plural applications on a basis of a request from a user. At this time, a user performs a predetermined operation via operation unit 13, and requires information-processing device 100 to execute an application(s).

When executing plural applications, information-processing device 100 displays plural windows corresponding to respective applications. At this time, information-processing device 100 displays windows by using a so-called overlap window method. Accordingly, information-processing device 100 is able to change a display position of each window, and is able to display plural overlapping windows. Control unit 11 of information-processing device 100 stores information relating to display positions of plural windows (hereinafter referred to as "window information"), and updates this information each time a window is moved. If there are plural overlapping windows, information-processing device 100 displays a window that has become active (a status receptive to an operations) most recently at the front. Therefore, a window displayed in the foreground is a currently active window.

If there are plural overlapping windows to be displayed, information-processing device 100 determines display priority levels of the windows by using the assignment information. In this operation, information-processing device 100 carries out a processing described below.

Figure 6:
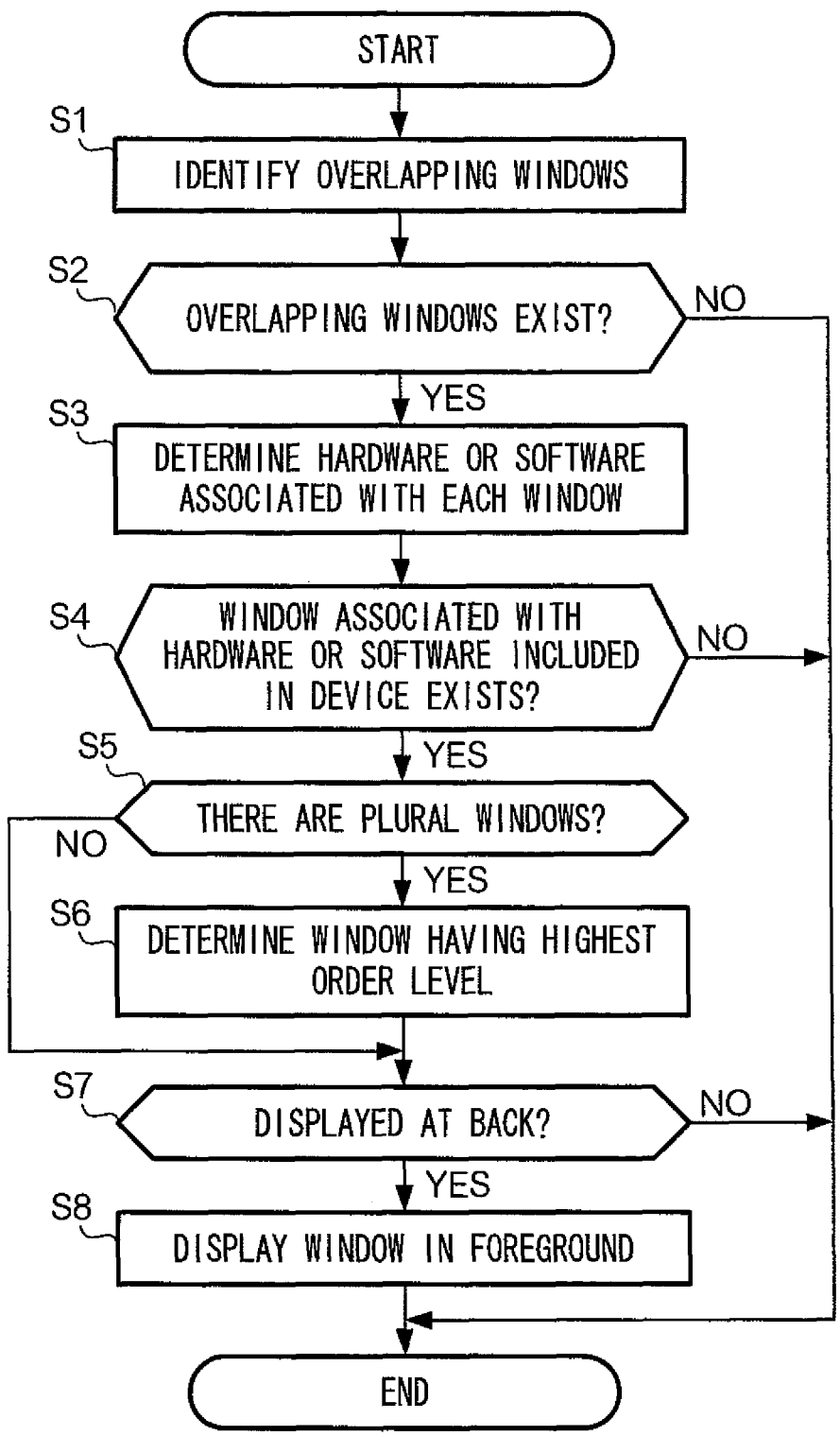
FIG. 6 is a flowchart showing an operation executed by an information-processing device.

FIG. 6 is a flow chart showing an operation executed by control unit 11 of information-processing device 100. This operation is realized as a function of the multitasking OS, and is performed at a predetermined interval of time. This operation may be also performed when a new window is displayed on a basis of a user operation, or a window is moved.

As shown in the drawings, control unit 11 firstly recognizes a condition in which windows are displayed on display unit 14, and identifies overlapping windows (step S1). At this time, control unit 11 determines a presence of any overlapping on the basis of stored window information. In this step, control unit 11 identifies both a window hiding another window and a window hidden by another window as an overlapping window. In other words, control unit 11 identifies as an overlapping window both a window displayed at the front and a window displayed at the back among plural overlapping windows. This also applies to a case where three or more windows overlap each other in designated area.

Subsequently, control unit 11 determines whether overlapping windows exist, by judging whether windows identified in step S1 exist (step S2). If it is determined that overlapping windows are displayed (step S2: YES), control unit 11 identifies an application corresponding to each of the identified windows, to determine hardware or software associated with the application (step S3). At this time, control unit 11 refers to assignment information to retrieve "ID" associated with an application displayed in the each of the identified windows, thereby determining associated hardware or software. If "ID" has an insignificant value, control unit 11 determines that there is no hardware or software associated with the application. Control unit 11 performs this determination for all overlapping windows. It is to be noted that since a window corresponds to a particular application, an attribution associated with an application can be considered to be attribution associated with a corresponding window also.

After determining associated hardware or software for each overlapping window, control unit 11 determines whether a window, to which hardware or software included in the device is assigned in the assignment information, is included in the overlapping windows (step S4). During this determination control unit 11 refers to "ID" corresponding to each window, and determines whether a value of the "ID" is included in the configuration information. If "ID" corresponding to a window is included in the configuration information, control unit 11 determines that hardware or software included in the device is assigned to the window.

If there is at least one window associated with a configuration (a hardware configuration and software configuration) of the device (step S4: YES), control unit 11 determines whether there are plural windows that are associated with the configuration of the device (step S5). If there are plural windows (step S5: YES), control unit 11 determines one window having highest "order level" in assignment information among these windows (step S6). Meanwhile, if there is only a single window associated with the configuration of the device (step S5: NO), control unit 11 skips the processing of step S6, and proceeds to a subsequent processing.

Subsequently, control unit 11 determines whether a subject window is displayed at the back (step S7). The subject window is the window determined in step S6, or if there is only a single window associated with the configuration of the device, that window is the subject window. Control unit 11 can designate either of the windows as the subject window in step S7. If the subject window is displayed at the back (step S7: YES), control unit 11 changes display order levels of the windows such that the subject window is displayed in the foreground, and outputs corresponding display data (step S8).

If the determination at step S2, S4 or S7 is negative (namely, NO), control unit 11 ends the processing without changing display order levels of windows. This is because in such a case, a window that should be displayed in the foreground is already displayed in the foreground.

Next, the above operation will be described with reference to an actual example of a display of windows. In the example, configuration information and determination information are the same as shown in FIG. 4 and FIG. 5, respectively. In addition, a window of game A is referred to as "w1," a window of game B is referred to as "w2," and a window of a balance inquiry application is referred to as "w3."

Figure 7:
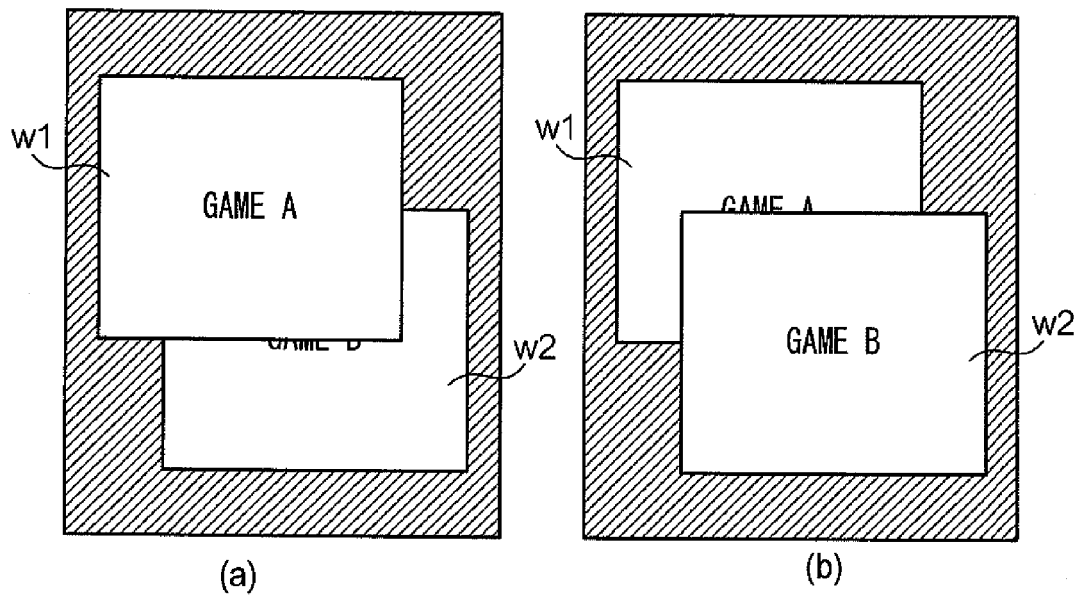
FIG. 7 is a diagram illustrating display of windows.

For example, in a case where both game A and game B are opened by information-processing device 100a, if those windows overlap each other, windows are displayed on display unit 14 as shown in FIG. 7(a). Specifically, control unit 11 of information-processing device 100a displays window w1 of game A at the front, and displays window w2 of game B at the back. This is because information-processing device 100a has first image-processing unit 15 associated with game A in the assignment information; however information-processing device 100a does not have camera unit 18 associated with game B in the assignment information.

On the other hand, in a case where both game A and game B are opened by information-processing device 100b, if those windows overlap each other, windows are displayed on display unit 14 as shown in FIG. 7(b). Specifically, control unit 11 of information-processing device 100b displays window w2 of game B at the front, and displays window w1 of game A at the back. This is because information-processing device 100b has camera unit 18 associated with game B in the assignment information; however information-processing device 100b does not have first image-processing unit 15 associated with game A in the assignment information.

Figure 8:
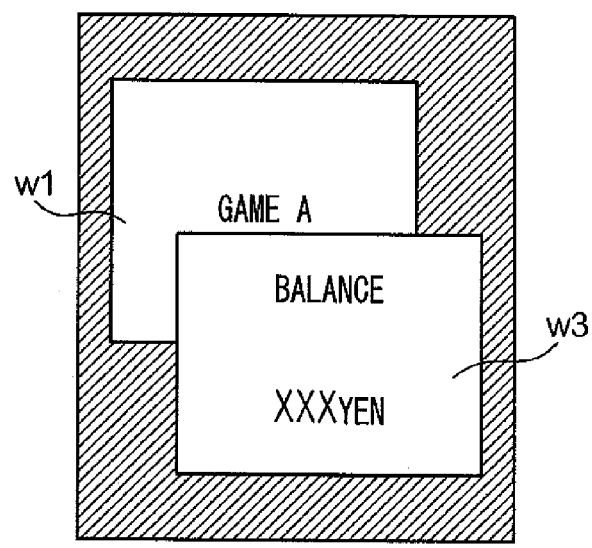
FIG. 8 is a diagram illustrating display of windows.

Next, in a case where both game A and a balance inquiry application are opened by information-processing device 100a, display control for those overlapping windows will be described. In this case, control unit 11 displays window w3 of the balance inquiry application at the front, and displays window w 1 of game A at the back (refer to FIG. 8). This is because information-processing device 100a has both first image-processing unit 15 associated with game A in the assignment information and an electronic settlement application associated with the balance inquiry application in the assignment information, and an order level assigned to the balance inquiry application is higher than that of game A.

Information-processing device 100 according to the present embodiment performs the above operation to display a window associated with assigned hardware or software as priority. In other words, information-processing device 100 is able to promote use of a particular application by applying such an assignment to the application.

In addition, information-processing device 100 according to the present embodiment is able to display a predetermined window associated with particular hardware or software as priority only if information-processing device 100 actually is provided with the hardware or software. In this way, in a case where plural information-processing devices 100 having different hardware or software configurations are available, and if the information-processing devices 100 are able to execute a common application, only information-processing device 100 having a particular configuration will be able to prominently display a window of the application.

Modifications

The present invention can be practiced as a different embodiment from the above embodiment. For example, the present invention can be practiced as an embodiment described below. In addition, modifications described below may be combined with each other.

(1) Modification 1

In the above embodiment, the control unit determines only a window to be displayed in the foreground, and display order levels of other windows are not given special mention. However, the control unit may determine a priority level for each overlapping window on the basis of the assignment information, and may display a window having higher priority level at the front. With the configuration employed, when a desired window is not displayed in the foreground, a user can view the window with few operations. Operations in this context may include closing a window displayed in the foreground and minimizing the window.

In this case, the control unit determines priority levels on the basis of both information of an order level and information of hardware or software, associated with each application. Now, an example of a case is described in which plural overlapping windows are displayed, including plural windows associated with hardware or software included in the device, and plural windows without this association.

Figures 9, 10:
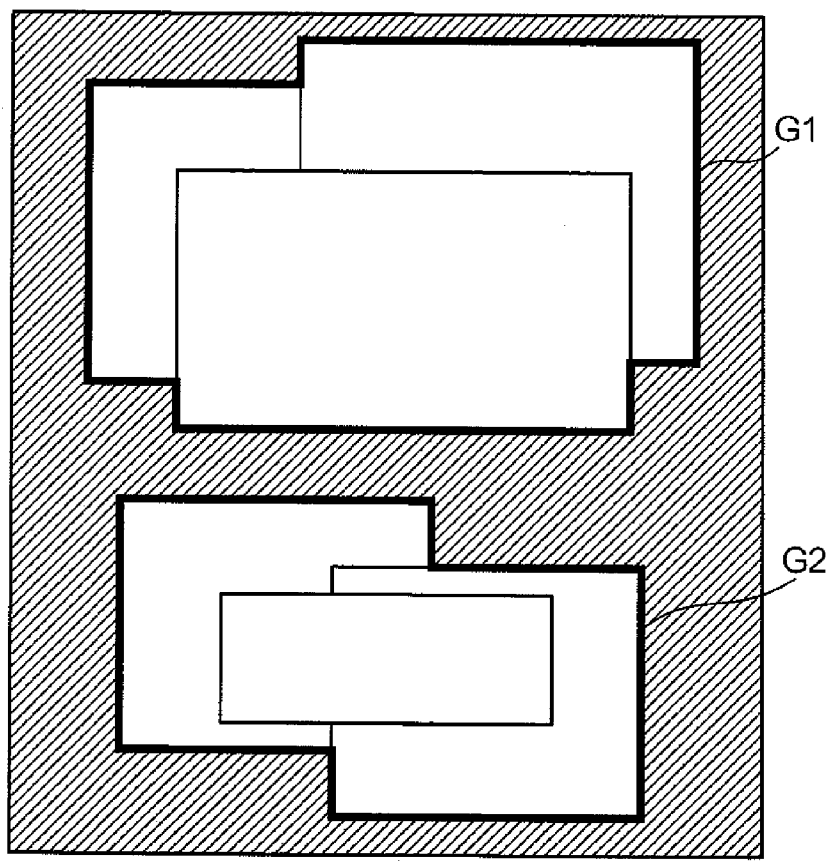
FIG. 9 is a diagram describing control for determining priority levels.
FIG. 10 is a diagram illustrating display of windows.

It is assumed that widows wa, wb, wc, wd, we and wf are displayed for plural predetermined applications, and these windows overlap each other as shown in FIG. 9. In addition, it is assumed that windows wa, wb and wc are associated with hardware and software included in the device, and windows wd, we and wf do not have this association (namely, are associated with hardware or software not included in the device, or do not have any such association, period.)

In this case, the control unit firstly sets priority levels to windows wa, wb and wc, which are associated with hardware or software included in the device, higher than those of windows wd, we and wf. The control unit then determines priority levels for windows wa, wb and wc as order levels, and determines priority levels for windows wd, we and wf as order levels. As a result, priority levels are determined by the control unit as shown in FIG. 9. In this case, the control unit displays a window having the highest priority level in the foreground.

(2) Modification 2

A window of a particular application may always have a predetermined priority level that does not depend on the assignment information. To realize this aspect, the control unit may store information to determine this window in advance, and if the window overlaps another window, the control unit may display the window on the basis of the predetermined priority level, regardless of a hardware configuration or a software configuration. If a user desire that the window of a particular application be displayed in the foreground, s/he may set the highest priority level to the application in advance.

If this embodiment is employed, and a window exists that may cause inconvenience to a user when the window is displayed at the back, such as a window displaying an important message relating to an operation of the device, a situation where the window is hidden by another window can be avoided.

This modification may be considered to be an aspect in which a window of a particular application is excluded from a subject for determination of priority levels. In this case, if plural windows that include assigned window overlap each other, the control unit determines display priority levels of windows other than the assigned window. The control unit displays the assigned window as the predetermined priority level, and displays other windows as priority levels determined based on the assignment information.

Assignment of a window may be performed by a user.

(3) Modification 3

A window to be displayed in the foreground may be determined on a basis of whether associated hardware or software has executed any processing. For example, if plural windows associated with hardware or software included in the device are displayed, and these windows overlap each other, the control unit may determine whether that hardware or software associated with each of these windows has executed some processing, and displays a window, processing of which is being executed.

An operation according to this modification is described below with reference to an actual example. For example, it is assumed that in a case where an electronic settlement application is associated with a balance inquiry application as shown in FIG. 4 and FIG. 5, the balance inquiry application and game A are executed, and those windows overlap each other. In this case, the control unit may determine whether the electronic settlement application is being executed, and if the result of such determination is affirmative, and it is determined that the electronic settlement application is being executed, the control unit may perform a display control to display a window of the balance inquiry application in the foreground.

As a result of this display control, a user can view necessary information without delay. In this case, if the electronic settlement application is executed and the electronic value increases or decreases, a window of the electronic settlement application is displayed in the foreground. Thus, a user can confirm an increase or decrease in an amount of an electronic value without a particular operation being carried out.

In this modification, the control unit may perform a particular processing to determine which hardware or software has been executed most recently, rather than processing to determine whether hardware or software associated with each of the overlapping windows has executed a processing. This is a display control to display, at the front of other windows, a window that is associated with hardware or software executed at a time closer to the instant of determination.

(4) Modification 4

In a case where plural windows overlap each other, if a window that is not associated with hardware and software included in the device is included in the overlapping windows, the control unit may perform a display control such that the window is not displayed. For example, when plural overlapping windows are displayed, the control unit may minimize windows other than a window to be displayed in the foreground, or stops to execute an application, a processing displayed in the window which is being executed.

(5) Modification 5

In the present invention, the number of windows to be displayed in the foreground need not be limited to one, only. For example, if windows are classified into plural groups as shown in FIG. 10, the control unit may determine windows to be displayed in the foreground for each group. A group in this context means a collection of windows included in an area surrounded by a closed outline. In an example shown in FIG. 10, windows are classified into group G1 and group G2. In this case, the control unit determines a window displayed in the foreground for each of group G1 and group G2. Either of windows in the foreground may be active. In other words, in the present invention, a screen of the display unit may be divided into each predetermined area, a window to be displayed in the foreground or display priority levels of windows may be determined for each area.

Further in the present invention, if there are plural windows that do not overlap each other, and all those windows are associated with hardware or software included in the device, the control unit may perform a control such that all the windows are displayed in the foreground. For example, in a case where there are windows wg, wh, wi and wj that do not overlap each other, while they overlap window wk as shown in FIG. 11, if windows wg, wh, wi and wj are associated with hardware or software included in the device, the control unit may display all windows wg, wh, wi and wj in the foreground.

(6) Modification 6

In the above embodiment, a single application is associated with a single window; however there is no necessity for the present invention to be applied to only one such relationship. For example, in a case of an application employing an MDI (Multiple Document Interface), plural windows may be displayed for a single application. Accordingly, if each window of such an application is associated with hardware or software, such an application can be applied to the present invention. For example, hardware or software may be associated with each window of an application such as a so-called tabbed browser, the control unit may perform a control of a screen displayed in the foreground on the basis of the association.

(7) Modification 7

In the above embodiment, the present invention is applied to a mobile phone; however the present invention may be applied to other information-processing devices. The present invention may be applied to various information-processing devices that display windows, for example, a communication terminal such as a PDA (Personal Digital Assistant), and a personal computer.

(8) Modification 8

In the above embodiment, the present invention is described as a function of the OS; however, the present invention may be realized as an independent application. Alternatively, a function of the present invention may be added to an existing application such as an OS as a so-called plug-in. When such a configuration is employed, the present invention may be provided as a program causing a computer (an information-processing device) to realize the above function. The program may be provided while being stored in a recording medium such as an optical disk, or provided from a predetermined server device via a network such as the Internet.

(9) Modification 9

The hardware configurations and the software configuration shown in FIG. 1 to FIG. 3 are examples of such configurations only. And as will be obvious to one skilled in the art, alternative hardware or software configurations may be employed, as required, in order to realize a specified window control function in accordance with the present invention, as described above.

The invention claimed is:

1. An information processing device comprising:
   a memory that stores configuration information containing an ID of hardware or software in the device, and assignment information associating information for identifying an application with an ID of hardware or software that is associated with the application;
   identifying means for identifying overlapping windows on a display means;
   judging means for retrieving from the assignment information the ID associated with the information for identifying an application corresponding to each of the identified windows, and judging whether the retrieved ID is contained in the configuration information;
   determining means for determining if the overlapping windows include a first window that corresponds to the ID judged by the judging means to be contained in the configuration information and a second window that corresponds to the ID judged by the judging means not to be contained in the configuration information, display priority levels among the overlapping windows so that a priority level of the first window is higher than a priority level of the second window; and
   display controlling means for controlling the display means to display the first window and the second window such that the first window is displayed in front of e the second window according to the priority level determined by the determining means.

2. The information-processing device according to claim 1, further comprising window selecting means for selecting a window;
   wherein if the window selected by the window selecting means is included in the overlapping windows identified by the identifying means, the display controlling means displays the window in a foreground.

3. The information-processing device according to claim 1, wherein if the judging means retrieves from the assignment information the ID associated with the information for identifying an application corresponding to each of the identified windows, and judging whether the retrieved ID is contained in the configuration information, the determining means sets a priority level of a window for which a processing of hardware or software assigned to the window is being executed, to be higher than a priority level for other of the windows.

4. The information-processing device according to claim 1, wherein if the judging means retrieves from the assignment information the ID associated with the information for identifying an application corresponding to each of the identified windows, and judging whether the retrieved ID is contained in the configuration information, the determining means sets a priority level of a window for which a processing of hardware or software assigned to the window has been executed most recently, to be higher than a priority level for other of the windows.

5. A process of prioritizing windows on a computer display, comprising the steps of:
   providing a memory that stores configuration information containing an ID of hardware or software in the device, and assignment information associating information for identifying an application with an ID of hardware or software that is associated with the application;
   identifying overlapping windows on a display means;
   retrieving from the assignment information the ID associated with the information for identifying an application corresponding to each of the identified windows;
   judging whether the retrieved ID is contained in the configuration information;
   determining if the overlapping windows include a first window that corresponds to the ID judged by the judging means to be contained in the configuration information and a second window that corresponds to the ID judged by the judging means not to be contained in the configuration information, display priority levels among the overlapping windows so that a priority level of the first window is higher than a priority level of the second window; and
   controlling the display means to display the first window and the second window such that the first window is displayed in front of the second window according to the priority level determined by the determining means.

* * * * *